(12) United States Patent
Laming et al.

(10) Patent No.: US 6,266,463 B1
(45) Date of Patent: Jul. 24, 2001

(54) CHIRPED OPTICAL FIBRE GRATING

(75) Inventors: Richard Ian Laming, Southampton; Michael Kevan Durkin, Droitwich, both of (GB); Valeria Gusmeroli, Milan (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/099,467

(22) Filed: Jun. 18, 1998

(30) Foreign Application Priority Data

Jun. 18, 1997 (GB) .................................................. 9712822
Jul. 1, 1997 (GB) .................................................. 9713939

(51) Int. Cl.$^7$ ...................................................... G02B 6/34

(52) U.S. Cl. ............................................ 385/37; 385/123

(58) Field of Search .................................. 385/27, 28, 29, 385/37, 123; 372/6, 9, 18, 20, 25, 26, 28, 29, 32, 33, 38

(56) References Cited

U.S. PATENT DOCUMENTS 5,715,265 * 2/1998 Epworth .................................. 372/38

FOREIGN PATENT DOCUMENTS 2 316 760 A 3/1998 (GB) .................................. 385/37 X
WO 96/36895 11/1996 (WO) .............................. G02B/6/16

OTHER PUBLICATIONS

M. Durkin et al., "1m Long Continuously-Written Fibre Bragg Gratings for Combined Second-and Third-Order Dispersion Compensation," Electronic Letters, vol. 33, No. 22, pp. 1891–1893, 1997.

J.A.R. Williams et al., "The Design of In–Fiber Bragg Grating Systems for Cubic and Quadratic Dispersion Compensation," Elsevier Science B.V., SSDI 0030–4018, pp. 62–66, Apr. 15, 1995.

T. Kurokawa, et al., "Time–Space–Conversion Optical Signal Processing Using Arrayed–Waveguide Grating," Electronics Letters, vol. 33, No. 2, pp. 1890–1893, Oct. 23, 1997.

Ashish M. Vengsarkar, et al., "Long–Period Fiber–Grating–Based Gain Equalizers", Optics Letters vol. 21, No 5, pp. 336–338, Mar. 1, 1996.

Jose Capmany, et al., "EDFA Gain Equalizer Employing Linearly Chirped Apodized Fiber Gratings", Microwave and Optical Technology Letters, vol. 12, No. 3, pp. 158–160, Jun. 20, 1996.

M.J. Cole, et al., "Moving Fibre/Phase Mask–Scanning Beam Technique for Enhanced Flexibility in Producing Fibre Gratings with Uniform Phase Mask," Electronics Letters, vol. 31, No. 17, Aug. 17, 1995, pp. 1488–1489.

J. Albert, et al., "Apodisation of the Spectral Response of Fibre Bragg Gratings Using a Phase Mask with Variable Diffraction Efficiency," Electronic Letters, vol. 31, No. 3, Feb. 2, 1995, pp. 222–223.

K.O. Hill, et al., "Chirped In–Fibre Bragg Grating Dispersion Compensators: Linearisation of Dispersion Characteristic and Demonstration of Dispersion Compensation in 100 km, 10 Gbit/s Optical Fibre Link," Electronic Letters, vol. 30, No. 21, Oct. 13, 1994, pp. 1755–1756.

* cited by examiner

*Primary Examiner*—Brian Healy
(74) *Attorney, Agent, or Firm*—Finnegan, Henderson, Farabow, Garrett & Dunner, L.L.P.

(57) ABSTRACT

A method of fabricating a chirped optical fibre grating so that the grating has a predetermined desired wavelength-dependent response across an operational bandwidth comprises apodising the grating so that a degree of apodisation at a longitudinal position along the grating corresponds to the desired response at the optical wavelength reflected at that longitudinal position along the grating.

16 Claims, 6 Drawing Sheets

CHIRPED OPTICAL FIBRE GRATING

BACKGROUND OF THE INVENTION

This invention relates to chirped optical fibre gratings.

Chirped optical fibre Bragg gratings are useful in, for example, dispersion compensation in optical fibre transmission links.

In a chirped optical fibre grating the pitch of the refractive index variations (which form the grating) varies with distance along the grating, which leads to a dispersive effect. The sign of the dispersion is dependent on which end of the grating light is launched into: pulses incident from the long wavelength end suffer negative dispersion in reflection, whilst pulses launched into the short wavelength end experience a positive dispersion in reflection.

This type of grating can suffer problems due to cladding mode losses. In order to explain this problem, cladding modes in optical fibres will first be described. Then, cladding modes in a uniform pitch (unchirped) fibre grating will be described, before the problem which occurs due to cladding mode losses in chirped optical fibre gratings is discussed.

The core of a single-mode optical fibre is designed to support a single polarisation-degenerate guided radiation mode for optical wavelengths longer than that defined by the so-called cut-off condition. Other than this fundamental ($LP_{01}$) mode, which is guided by the core-cladding interface, there exists a set of discrete higher-order radiation modes ($LP_{0n}$) which are supported by the cladding of the fibre and are guided by the cladding-air, or cladding-coating interface.

The spatial extent of the cladding mode field increases with the mode order and there is a corresponding reduction in the overlap between the mode and the core area. As the cladding has a lower refractive index than the core, radiation propagating as a cladding mode will experience a lower group index (and hence a smaller propagation constant, $\beta$) than radiation propagating in the fundamental $LP_{01}$ mode. Modes supported predominantly in the cladding of a fibre are highly susceptible to out-coupling from the fibre if there are any small defects in the cladding-air (or cladding-coating) interface. Radiation in a cladding mode thus may be guided for just a few centimeters before it is out-coupled, making propagation in cladding modes extremely lossy.

The condition for reflection by a uniform fibre grating is the so-called Bragg phase-matching condition, which is met when the propagation constant of the grating, K, is equal to the sum of the forward- and backward-propagating mode constants, $\beta_{+01}$ $\beta_{-01}$:

$$K = \beta_+ + \beta_{-01}$$

This occurs at the so-called Bragg wavelength. However, the condition for phase matching between a fundamental forward-propagating guided mode and a backward-propagating cladding mode is also met for radiation of wavelengths away from the fundamental Bragg wavelength.

The propagation constants of cladding modes are smaller than those of the fundamental $LP_{01}$ mode and so coupling into a backward propagating cladding mode may occur from a forward propagating $LP_{01}$ mode of a larger propagation constant (shorter wavelength), where:

$$K = \beta_{+01} + \beta_{-0n}$$

where $\beta_{-0n}$ is the propagation constant of the nth backward propagating cladding mode.

This coupling of radiation from fundamental guided modes to cladding modes is visible as a series of discrete losses on the short wavelength side of the main Bragg reflection peak, shown in FIG. 1 of the accompanying drawings. The position and strength of cladding mode losses relative to the main Bragg reflection is determined by the refractive index geometry of the fibre host to the grating. The first cladding mode is observed at wavelengths typically a few nanometers short of the Bragg wavelength.

The way in which cladding mode losses affect chirped gratings will now be discussed.

It is often desirable to use chirped fibre gratings with bandwidths greater than the separation of the first cladding mode from the main Bragg reflection to induce a negative chirp (i.e. pulses are launched into, and reflected from, the long wavelength end of the grating). In many systems it is also quite critical that the relative intensities of pulses reflected by the grating should not vary across the useable bandwidth.

This presents a problem where the shortest wavelength of the grating's useable bandwidth is below that of the first cladding mode associated with the longest spatial period of the grating. In this case, a fraction of the short wavelength light is coupled from its fundamental forward-propagating mode into a lossy cladding mode. This effect is generally seen only when using fibre Bragg gratings in a negative dispersion sense as, in this configuration, short wavelength light has to propagate through the "longer wavelength" portions of the grating, where the propagation constant is appropriate for coupling shorter wavelengths to a cladding mode) before arriving at the appropriate part of the grating for Bragg reflection of the short wavelength light.

The distributed nature of spatial frequencies in a chirped fibre grating means that the losses caused by the coupling of short wavelengths into cladding modes are integrated along the length of the grating.

In a chirped grating which should have a uniform reflectivity across the useable band, the coupling of shorter wavelengths into cladding modes actually causes a sloped response extending from the short wavelength end of the grating to the wavelength of the first cladding mode associated with the longest wavelength of the grating.

FIGS. 2a and 2b of the accompanying drawings illustrate this effect on the spectral response of a high-quality 7.5 nm (nanometer) bandwidth chirped fibre grating (total chirp 8.54 nm) when used in the negative dispersion sense, compared to the flat-top spectral response observed from the same grating used in the positive dispersion sense.

In particular, FIG. 2a illustrates the reflection response when light is introduced from the short wavelength end of the grating, while FIG. 2b illustrates the corresponding reflection response when light is introduced from the long wavelength end of the same grating.

For comparison with later results from prototype embodiments of the invention, FIG. 2c illustrates the transmission response of the grating and FIG. 2d illustrates the dispersion of the grating.

The size of this lossy effect is determined by the strength of coupling to the cladding modes, which is, for a given fibre, determined by the coupling constant of the grating. For strong chirped gratings the loss may be as much as several dB (decibels) in reflection, which is more than enough to cause significant problems in applications sensitive to in-band intensity non-uniformities.

SUMMARY OF THE INVENTION

This invention provides a method of fabricating a chirped optical fibre grating so that the grating has a predetermined desired wavelength-dependent response across an operational bandwidth, the method comprising apodising the grating so that a degree of apodisation at a longitudinal position along the grating is dependent upon the desired response at the optical wavelength reflected at that longitudinal position along the grating.

Although it would in theory be possible to alleviate the problems described above by both shifting the first cladding mode away from the Bragg wavelength and reducing coupling to cladding modes from $LP_{01}$ modes by way of a suitable fibre design (such as high NA, or depressed-cladding fibres), it is not possible in practice to achieve a great enough spectral shift and strong enough attenuation of the losses induced by coupling to cladding modes to allow strong chirped fibre gratings to have a flat reflection spectrum for bandwidths of greater than several nanometers without some careful and deliberate compensation of cladding mode effects.

In contrast, in the invention, because the phase-matching wavelengths of a chirped fibre grating are spatially distributed along its length, a controlled variation of the local grating coupling-constant can be used to change the local Bragg reflectivity and hence the strength of coupling to the associated cladding modes. It is thus possible to design a substantially coupling-constant profile for a fibre grating that can equalise the reflection spectrum across its whole bandwidth.

The use of apodisation has advantages over other techniques for controlling the coupling strength of a fibre grating, e.g. by changing the fluence of UV beam used in the writing process. Changing the fluence has the undesirable effect of changing the local background refractive index in the fibre core, and hence leads to an (unwanted) chirping effect.

In contrast, in the invention, apodisation is employed whereby the background index remains unchanged but the amplitude of the periodic grating structure is modulated [see publication reference 1]. Apodisation is a technique which is known in other areas; for example, it is presently used to reduce the strength of fibre gratings at either end in order to reduce undesirable coherence effects. With regard to the invention, it has been appreciated that apodisation can be used to control the strength of the grating along its length.

Tailoring the local apodisation of a grating is therefore a highly advantageous method for controlling the local coupling constant in a way that can be used to flatten the spectral response of a chirped fibre grating. By using apodisation to control the local coupling constant it is possible to fabricate a grating with a reflectivity profile that combines with the spectral shaping resulting from cladding mode losses to generate a flat reflectivity profile over the bandwidth of the grating. The apodisation profile should preferably be such that there is a reduced coupling coefficient at the long wavelengths that cause the short wavelength cladding mode loss.

Further respective aspects and preferred features of the invention are defined in the appended claims. It will be appreciated that subclaims may be combined with the various different aspects of the invention in combinations other than those explicitly shown.

BRIEF DESCRIPTION OF THE DRAWINGS

The invention will now be described by way of example with reference to the accompanying drawings, throughout which like parts are referred to by like references, and in which.

DETAILED DESCRIPTION OF THE INVENTION

Embodiments of the invention will be described with reference to test gratings fabricated in a deuterium-loaded fibre with an NA (numerical aperture) of ~0.2, a group index of ~1.451 and a cut-off wavelength of 1250 nm. The total chirp over the 750 mm length of the grating was 8.54 nm, giving a useable bandwidth of 7.5 nm. Ten percent of the total grating length was apodised using a conventional profile (e.g. a raised cosine profile) at either end of each grating to reduce coherent end effects. (Similarly manufactured gratings were used for the results described earlier with reference to FIGS. 2a and 2b).

A prototype apodised chirped grating was fabricated using an apodisation profile with a grating index modulation amplitude or envelope described by:

$$\alpha = (1-\gamma)(z-z_0)^2/z_0^2 + \gamma \quad z \leq z_0$$
$$= \gamma \quad z > z_0$$

where z is the normalised distance along the grating from the short wavelength end, $z_0$ is the location in the grating where the effect of cladding mode loss first becomes apparent ($z_0$=0.6 in this case), and $\gamma$ is the relative strength of the grating in the region $z > z_0$. This function is illustrated schematically in FIGS. 4a to 4c.

Figure 4A:
FIGS. 4a to 4c schematically illustrates the apodisation profile applied to the grating of FIGS. 3a to 3d.
Figure 4B:
Figure 4C:
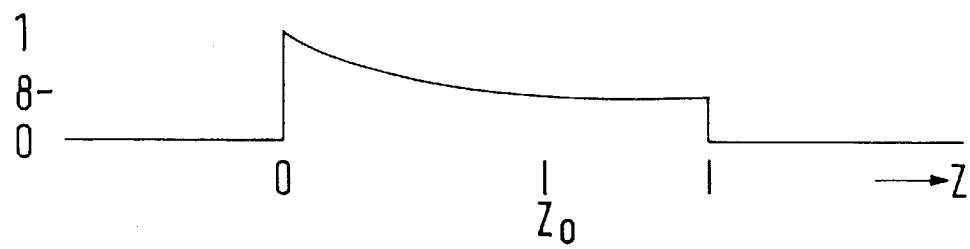

In particular, FIG. 4a schematically illustrates a chirped fibre grating 5. FIG. 4b illustrates the "normal" apodisation applied to such a grating, to reduce coherent end effects. This involves applying a raised cosine function to each extreme 10% of the grating ($0 \leq z < 0.1$ and $0.9 < z \leq 1.0$). FIG. 4c illustrates the above function, which is applied in addition to the "normal" apodisation function of FIG. 4b.

Figure 1:
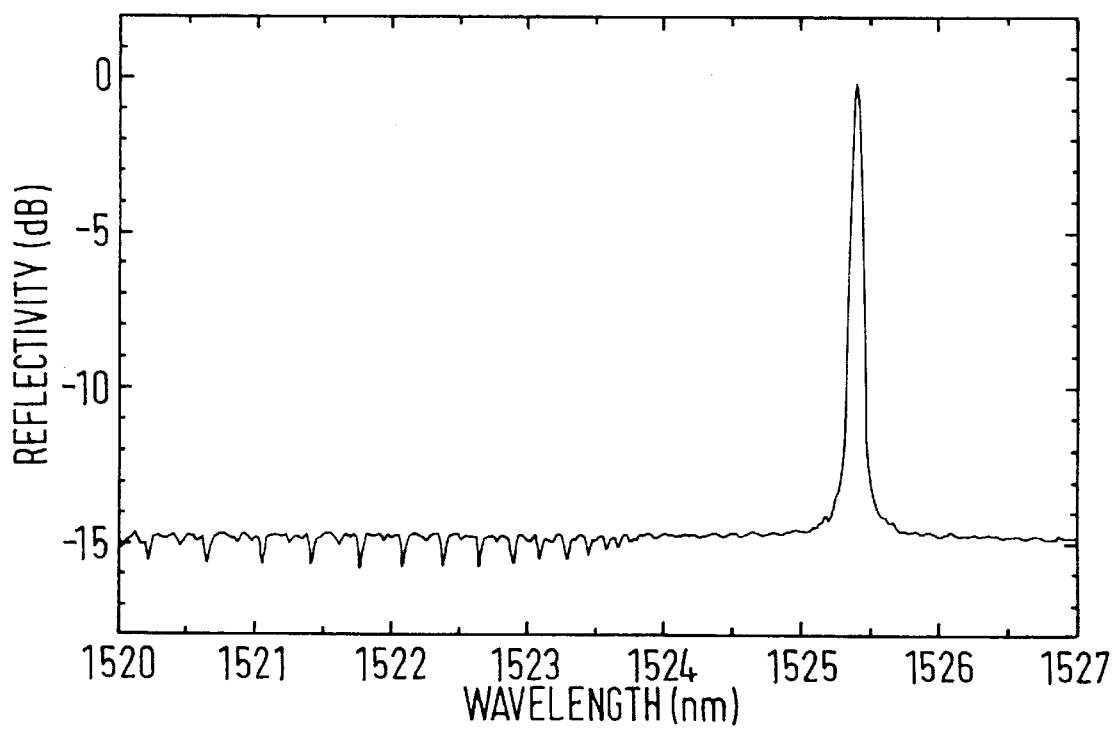
FIG. 1 is a graph illustrating cladding mode losses in a uniform pitch grating.
Figure 2A:
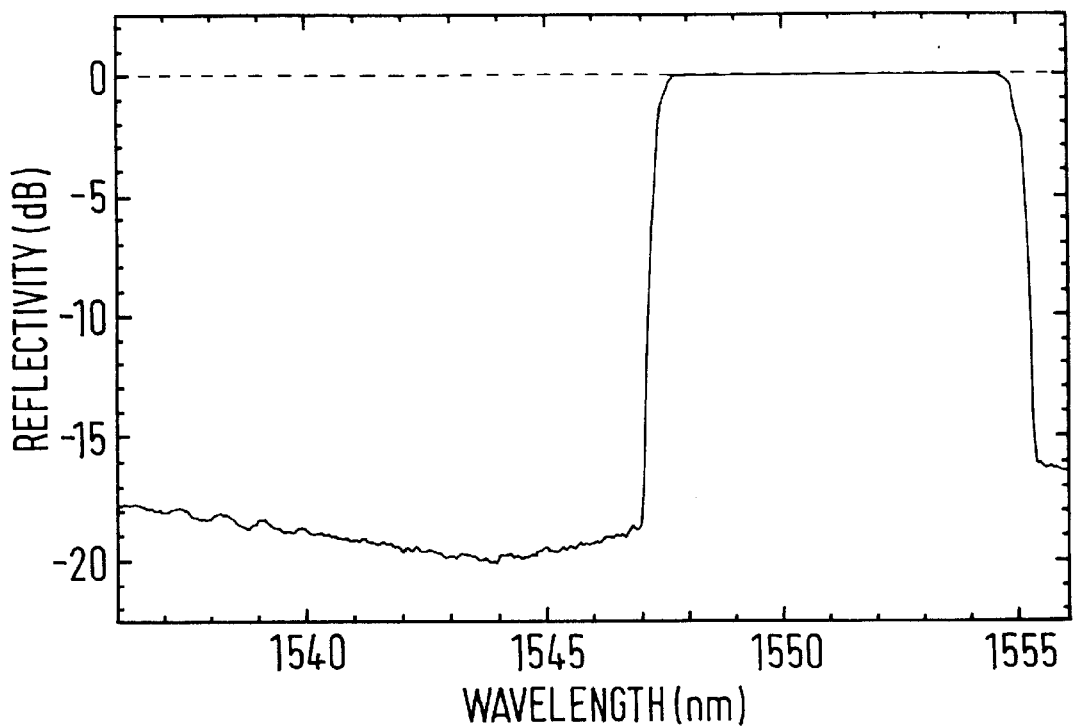
FIGS. 2a and 2b are graphs illustrating the reflection response of a chirped grating when light is launched from the short-wavelength end (FIG. 2a) and the long wavelength end (FIG. 2b)
Figure 2B:
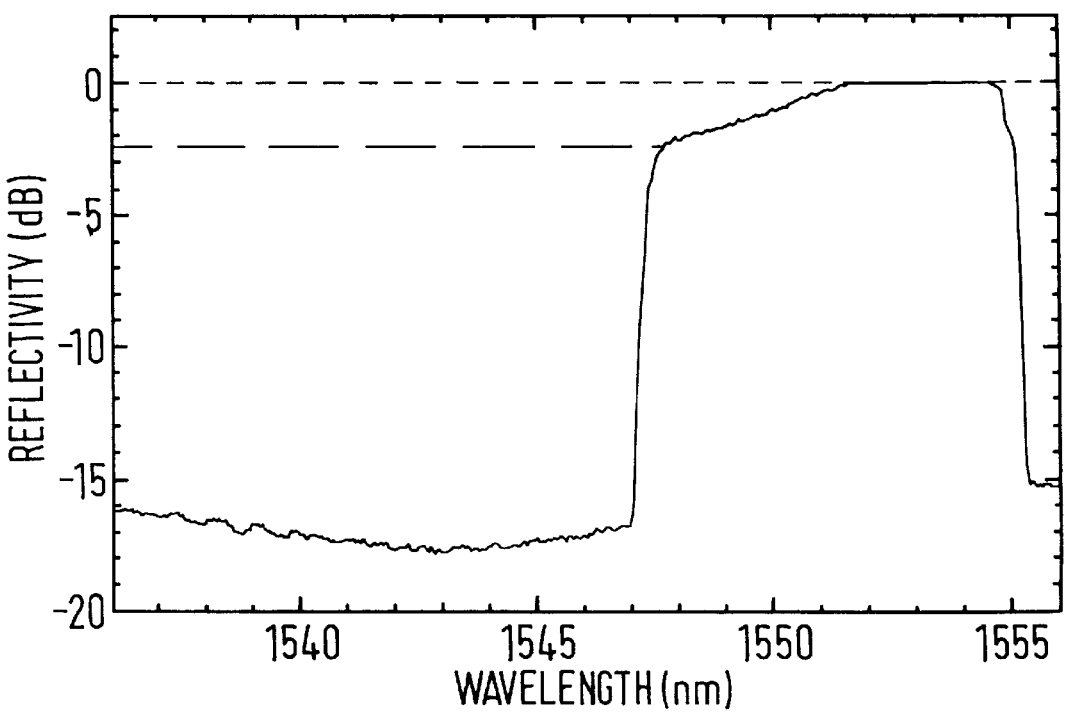
Figure 2C:
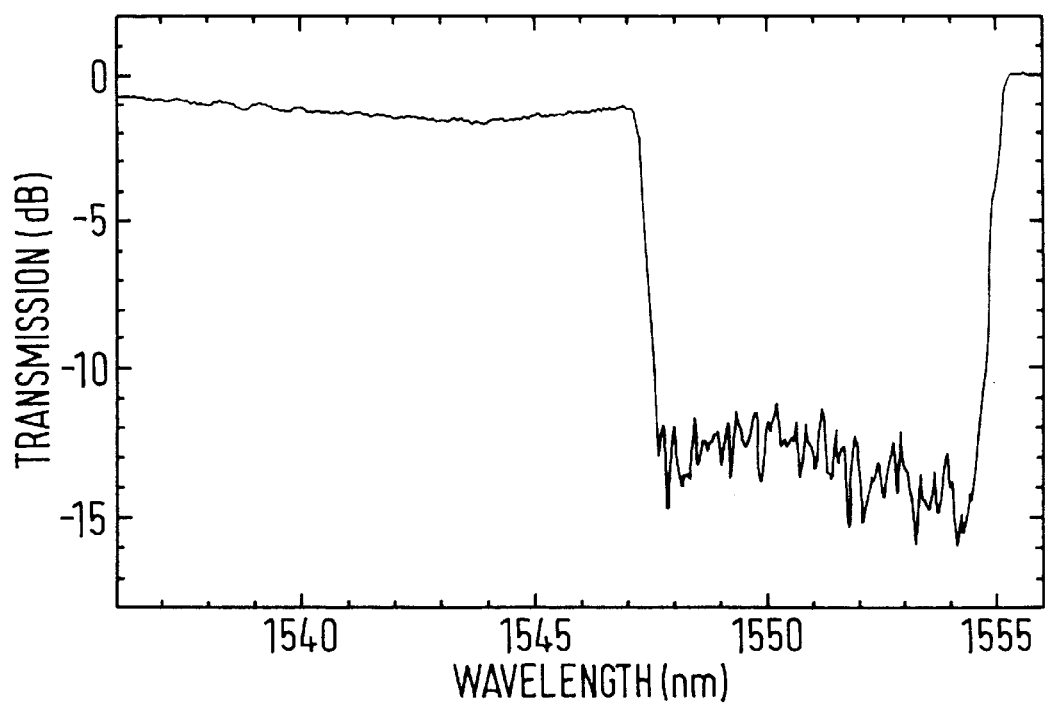
FIGS. 2c and 2d illustrate properties of a chirped fibre grating.
Figure 2D:
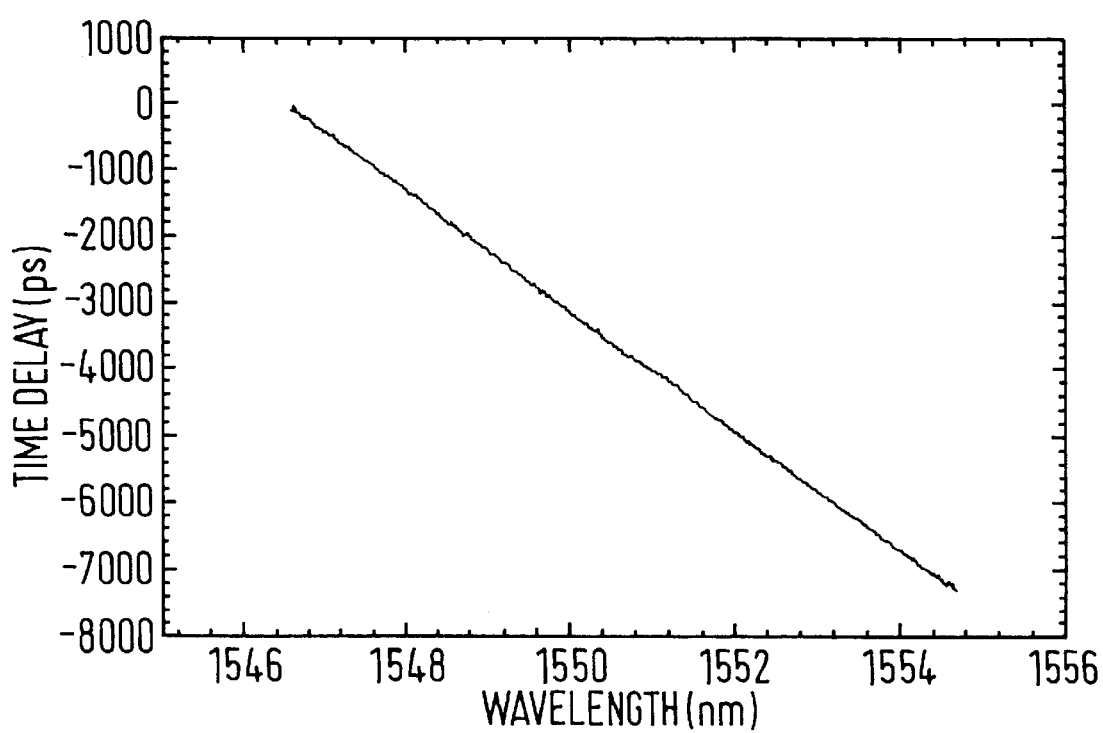

The function of FIG. 4c is intended to be substantially complementary to the non-uniformities of the wavelength-dependent loss shown in FIG. 2b. So, where the wavelength-dependent loss of FIG. 2b increases, the strength of the grating dictated by the apodisation function of FIG. 4c increases, to counteract that loss, and vice-versa.

The values of $z_0$ and $\gamma$ are fibre dependent and routinely measurable, but in general $\gamma$ will be larger and $z_0$ will be smaller for higher NA fibres where the coupling to lower order cladding modes is both suppressed and shifted further from the Bragg wavelength. Other apodisation functions could of course be used.

Applying this or a similar apodisation function requires no substantive changes to existing fibre design or fabrication procedure (providing the fabrication procedure allows control of apodisation over the grating length—as many such procedures do [1, 6]), and adds an extra free parameter in the design of high-quality in-fibre Bragg devices that is immediately applicable to broadband chirped gratings used for dispersion compensation.

FIGS. 3a to 3d are graphs illustrating the properties of a broadband 7.5 nm chirped apodised grating, showing the use of a custom apodisation profile to flatten the spectral response.

Figure 3A:
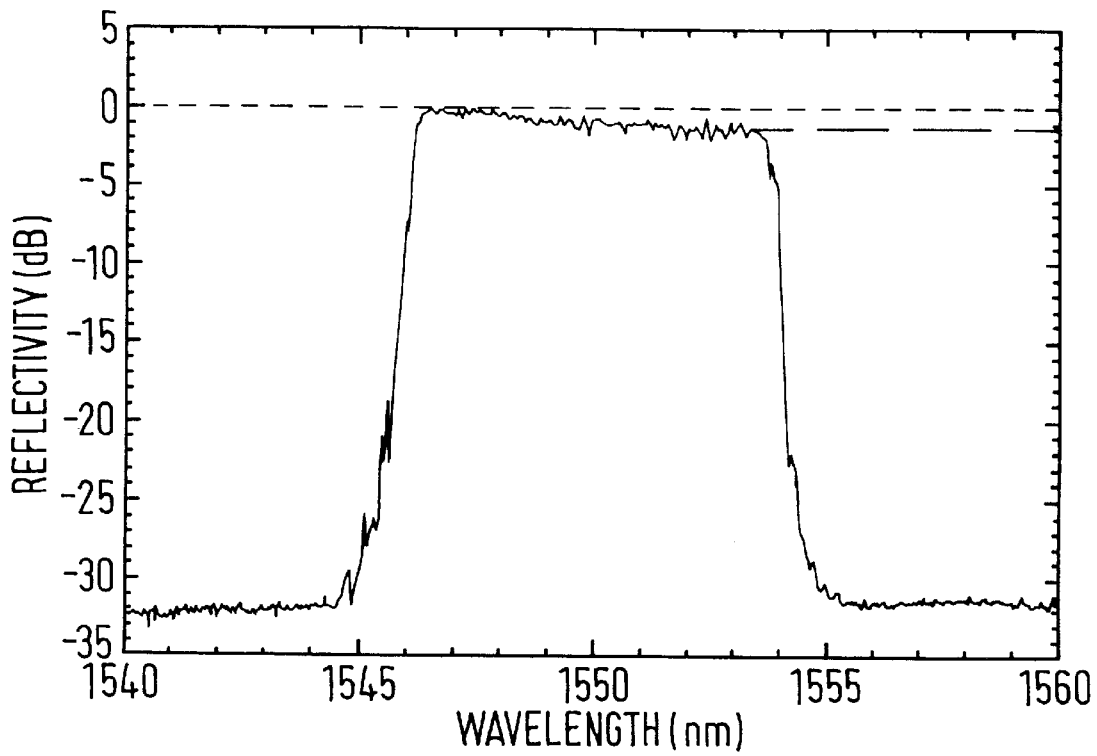
FIGS. 3a to 3d are graphs illustrating the properties of an apodised chirped grating.
Figure 3B:
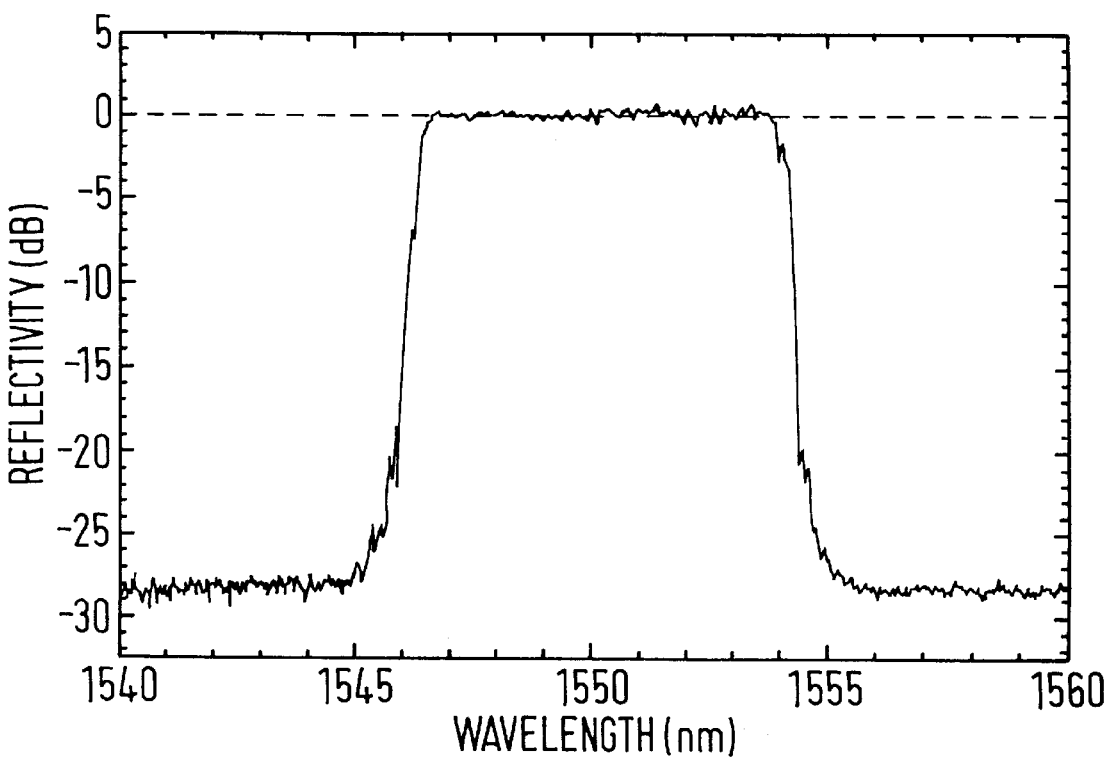
Figure 3C:
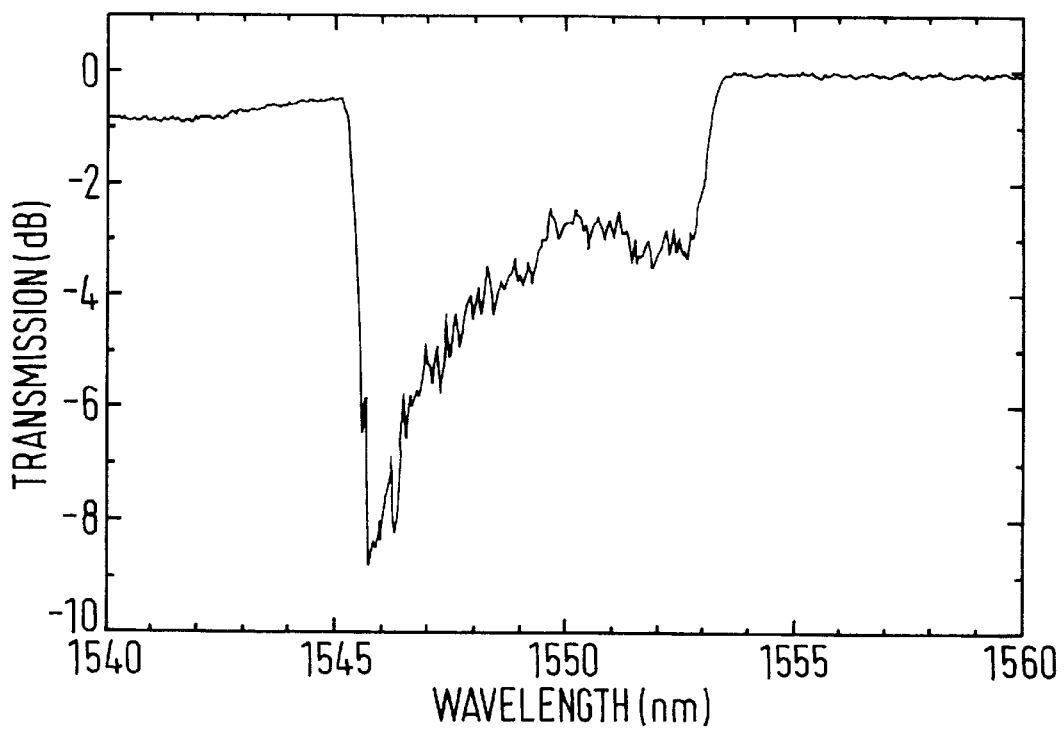
Figure 3D:
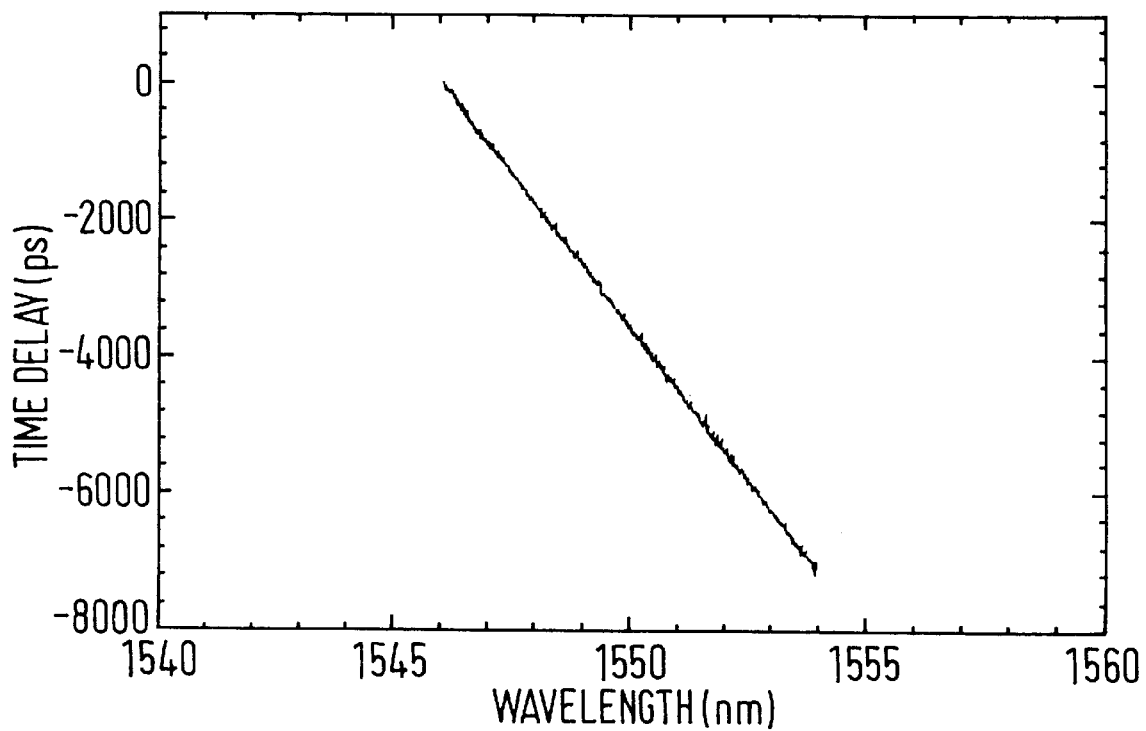

In particular, FIG. 3a illustrates the reflection response when light is introduced from the short wavelength end of the grating, while FIG. 3b illustrates the corresponding reflection response when light is introduced from the long wavelength end of the same grating. FIG. 3c illustrates the transmission spectrum, and FIG. 3d the dispersion characteristic for light launched into the long wavelength end of the grating.

Comparing this data to that of FIGS. 2a and 2b shows that the apodisation profile is very successful in equalising the spectral response of the grating when used in a negative dispersion sense: there is no perceivable slope on the short wavelength response of the grating when viewed from the long wavelength end. The shape of the reflection spectrum viewed from the short wavelength end illustrates the effect of the apodisation profile without the contribution of cladding mode loss.

The time-delay/wavelength characteristic of this fibre grating (shown in FIG. 3d) illustrates that the use of a reflectivity-tailoring apodisation profile has no adverse effects of the dispersion (which was designed to be uniform in this case).

The technique can also be applied to spectral equalisation of reflectivity for fibre gratings with non-uniform coupling constants.

The development of high quality chirped fibre gratings suitable for compensating the 2nd order dispersion of pulses propagating in non-dispersion shifted fibre has led researchers to look at the possibility of developing devices that are also capable of compensating the 3rd order dispersion [2,3]). Gratings designed solely for 2nd order dispersion compensation are linearly chirped, whereas those designed for combined 2nd and 3rd order dispersion compensation must be fabricated with a non-uniform chirp rate (specifically, with a wavelength that varies with a square-root function of the position in the grating).

A natural consequence of varying the local chirp rate of a grating is that its local coupling constant will also change (higher chirp rates lead to smaller coupling constants) resulting in a decrease in reflectivity at those wavelengths where the chirp rate is highest.

Although an increase in fluence of the UV writing beam during fabrication could be used to equalise the spectral response of the grating, the chirp induced as a result of the changing background refractive index would spoil the dispersion profile. An alternative method would be to use the present technique of apodisation-profile tailoring of grating strength. The use of apodisation to maintain a constant coupling-coefficient would also circumvent the problem of inducing unwanted chirp in the grating.

The technique can also be applied to fabricating chirped fibre gratings with reflectivity spectra suitable for so-called gain flattening.

The need for compensation of fibre dispersion has arisen largely as a result of the vast benefits offered by the Erbium-doped fibre-amplification compared to the relatively restrictive bandwidth and transmission-rate confines of electronic amplification and pulse regeneration.

Prior to the development of the Erbium-doped Fibre Amplifier (EDFA), most telecommunications systems operated at the wavelength of 1.3 $\mu$m where the dispersion-zero of standard step-index fibre lies. Aside from the obvious advantages of all-optical pulse amplification, the widespread move to the 1.55$\mu$m window of the EDFA has brought with it the problems of pulse dispersion and a non-uniform gain profile.

An extension of the techniques described above is to design an apodisation profile for a chirped fibre grating that gives a spectral response such that, in reflection, the amplitudes of pules amplified by an EDFA are equalised over the bandwidth of the grating (be it part, or all, of the EDFA bandwidth).

Figure 5:
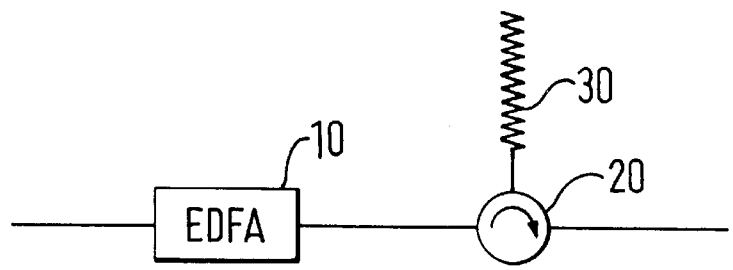
FIG. 5 schematically illustrates an optical processing system.

Such a technique is shown schematically in FIG. 5, where an EDFA 10 is connected via an optical circulator 20 to an apodised chirped grating 30 of the type described above, connected in a negative dispersion sense. The apodisation profile of the grating is selected so that the grating loss is substantially complementary to the non-uniformity of the gain of the EDFA, to give an overall system response which is substantially flat over the operational bandwidth of the system.

Figure 6:
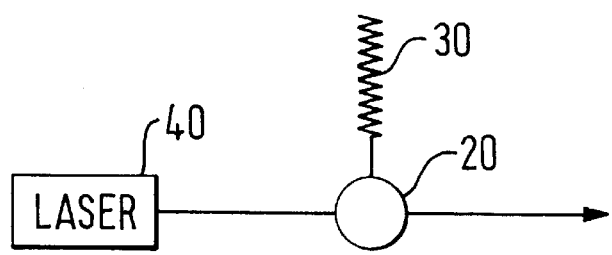
FIG. 6 schematically illustrates an optical source system.

FIG. 6 schematically illustrates a similar technique for flattening the spectrum of an optical source 40 (e.g. a laser source), whereby the grating 30 has an apodisation profile substantially complementary to the non-uniformities of the source 40, to give a resulting flat (or other desired) spectrum over the operational bandwidth. This spectrum equalisation function can of course be combined with a dispersion compensation function.

Although several EDFA gain-flattening techniques have been proposed and demonstrated (such as long-period fibre gratings [4], and short-period fibre gratings in transmission [5]), none makes use of the dispersive potential of the short-period grating. The use of apodisation to tailor the reflectivity of a short-period chirped fibre grating introduces no adverse chirping effects and so the grating may still be designed to satisfy a dispersive role. It is thus possible to use a single chirped fibre grating to both compensate for non-zero fibre dispersion and to spectrally equalise optical pulses amplified by an optical amplifier with a non-uniform gain profile. The combination of these two highly desirable components in a single passive device is extremely attractive in terms of production time and cost, stability, insertion loss, and ease of packaging.

It is believed that a device such as this is both of significant contemporary value (for sources with some wavelength drift) and of great future importance in wavelength-division multiplexed transmission systems.

The rapid development of fibre gratings and the increasing diversity of their design and application will inevitably lead to more grating structures with large bandwidths and non-uniform local coupling-constants.

The techniques and results described above show that the use of custom apodisation profiles to equalise the spectral response of a grating over its bandwidth is both successful and, once appreciated, relatively straightforward to implement. The application of apodisation-controlled profiles of local coupling-constants is not restricted to compensation of cladding mode losses and spectral flattening of gratings deigned for combined 2nd and 3rd order dispersion compensation: rather it is envisaged that it will become an implicit stage in the design of fibre gratings.

In summary, the embodiment demonstrates an example of the use of apodisation to control the spectral response of a grating for the immediate problem of producing wide bandwidth gratings for use in compensating the (positive) dispersion of standard step-index fibres with a dispersion zero at ~1.3 $\mu$m.

PUBLICATION REFERENCES

1. Patent Application GB9617688.8.
2. Williams, J A R et al, "The Design of In-Fibre Bragg Grating Systems for Cubic and Quadratic Dispersion Compensation", Opt. Commun. 116, 62–66.
3. Durkin, M et al, "1m Long Continuously-Written fibre gratings for Combined 2nd and 3rd Order Dispersion Compensation", Electron Lett., 1997, Vol 33, No. 22, pp. 1891–1893.
4. Vengsarkar, A M et al, "Long-Period Fibre-Grating-Based Gain Equalizers", Optics Letters, 1996, Vol. 21, No.5, pp. 336–338.
5. Capmany, J et al, "EDFA Gain Equalizer Employing Linearly Chirped Apodized Fibre Gratings', Microwave and Optical Technology Letters, 1996, Vol. 12, No.3, pp. 158–160.
6. WO 96/36895

What is claimed is:

1. A method of fabricating a chirped optical fibre grating so that the grating has a predetermined desired wavelength-dependent response across an operational bandwidth, the method comprising apodising the grating with an asymmetric apodisation profile so that a degree of apodisation at a longitudinal position along the grating is dependent upon the desired response at the optical wavelength reflected at that longitudinal position along the grating.

2. A method of fabricating a chirped optical fibre grating having a substantially flat wavelength-dependent response across an operational bandwidth, the method comprising apodising the grating so that a degree of apodisation at a longitudinal position along the grating provides a degree of loss substantially complementary to the degree of loss of the grating before apodisation at the optical wavelength reflected at that longitudinal position along the grating.

3. A method according to claim 1 or claim 2, in which the operational bandwidth of the grating is such that light reflected by the grating suffers cladding mode losses.

4. A chirped optical fibre grating having an asymmetric apodisation profile.

5. A chirped optical fibre grating having an apodisation profile varying substantially monotonically across a majority of the length of the grating, in which the degree of apodisation along the grating is substantially linearly related to the pitch of the grating.

6. An optical system for receiving an input optical signal and processing the input optical signal with a desired wavelength-dependent response to generate an output optical signal, the system comprising:

an optical processing element having a wavelength-dependent response; and a chirped optical fibre grating connected to the optical processing element so that the input optical signal is processed by both the optical processing element and the chirped optical fibre grating to generate the output optical signal;

the chirped optical fibre grating having an asymmetric apodisation profile varying with longitudinal position along the grating, so that a combination of the wavelength-dependent response of the apodised grating and the wavelength-dependent response of the optical processing element provides the desired wavelength-dependent response.

7. A system according to claim 6, in which:

the optical processing element has a non-uniform wavelength-dependent response; and the wavelength-dependent response of the apodised grating is substantially complementary to the non-uniform wavelength-dependent response of the optical processing element, so that the combination of the wavelength-dependent response of the apodised grating and the non-uniform wavelength-dependent response of the optical processing element provides a substantially flat wavelength-dependent response across an operational bandwidth of the system.

8. A system according to claim 6 or claim 7, in which the optical processing element is an optical amplifier.

9. An optical source system for generating an output optical signal having a desired output spectrum, the system comprising:

an optical source element for generating a source optical signal; and a chirped optical fibre grating connected to the optical source element so that the source optical signal is processed by the chirped optical fibre grating to generate the output optical signal;

the chirped optical fibre grating having an asymmetric apodisation profile varying with longitudinal position along the grating, so that a combination of the spectrum of the source optical signal and a wavelength-dependent response of the apodised grating generates the output optical signal having the desired output spectrum.

10. A system according to claim 9, in which:

the source optical signal has a non-uniform spectrum over an operational bandwidth; and the wavelength-dependent response of the apodised grating is substantially complementary to the non-uniform spectrum of the source optical signal so that the combination of the spectrum of the source optical signal and the wavelength-dependent response of the apodised grating generates the output optical signal having a substantially flat output spectrum across the operational bandwidth.

11. A grating according to claim 4 or 5, in which the grating is connected in a negative dispersion reflection configuration.

12. A grating according to claim 4 or 5, in which the grating is over about 20 centimeters long.

13. A grating according to claim 4 or 5, in which the grating has a chirp of at least about 4 nanometers.

14. A system according to any one of claims 6, 7, 9, or 10 in which the grating is connected in a negative dispersion reflection configuration.

15. A system according to any one of claims 6, 7, 9, or 10 in which the grating is over about 20 centimeters long.

16. A system according to any one of claims 6, 7, 9, or 10 in which the grating has a chirp of at least about 4 nanometers.

* * * * *